United States Patent [19]

Haupt

[11] 4,018,297

[45] Apr. 19, 1977

[54] FOUR-PIECE FAN SHROUD

[75] Inventor: Robert C. Haupt, Milwaukee, Wis.

[73] Assignee: Allis-Chalmers Corporation, Milwaukee, Wis.

[22] Filed: Nov. 3, 1975

[21] Appl. No.: 628,522

[52] U.S. Cl. .......................... 180/54 A; 123/41.49; 415/182

[51] Int. Cl.² ........................................ B60K 11/02

[58] Field of Search ...................... 180/54 A, 68 R; 123/41.49; 165/122, 51; 52/648; 415/207, 210, 219 R, 182

[56] References Cited

UNITED STATES PATENTS

| 1,130,444 | 3/1915 | Sullivan | 123/41.49 |
|---|---|---|---|
| 1,301,784 | 4/1919 | Calkins | 123/41.49 |
| 1,466,472 | 8/1923 | Fales | 415/182 |
| 1,787,656 | 1/1931 | Anderson | 415/182 |
| 3,144,859 | 8/1964 | Walton | 123/41.49 |
| 3,827,825 | 8/1974 | Shipes | 415/219 R |
| 3,858,644 | 1/1975 | Beck et al. | 180/54 A |
| 3,914,063 | 10/1975 | Papayoti | 52/648 |
| 3,937,189 | 2/1976 | Beck | 180/54 A |

*Primary Examiner*—Robert R. Song
*Assistant Examiner*—David M. Mitchell
*Attorney, Agent, or Firm*—Arthur L. Nelson

[57] ABSTRACT

A multi-piece fan shroud having a front mounting flange adapted for fastening to a radiator of a motor vehicle and rear venturi portion for discharge of air to improve the efficiency and quietness of operation of the fan and shroud.

10 Claims, 8 Drawing Figures

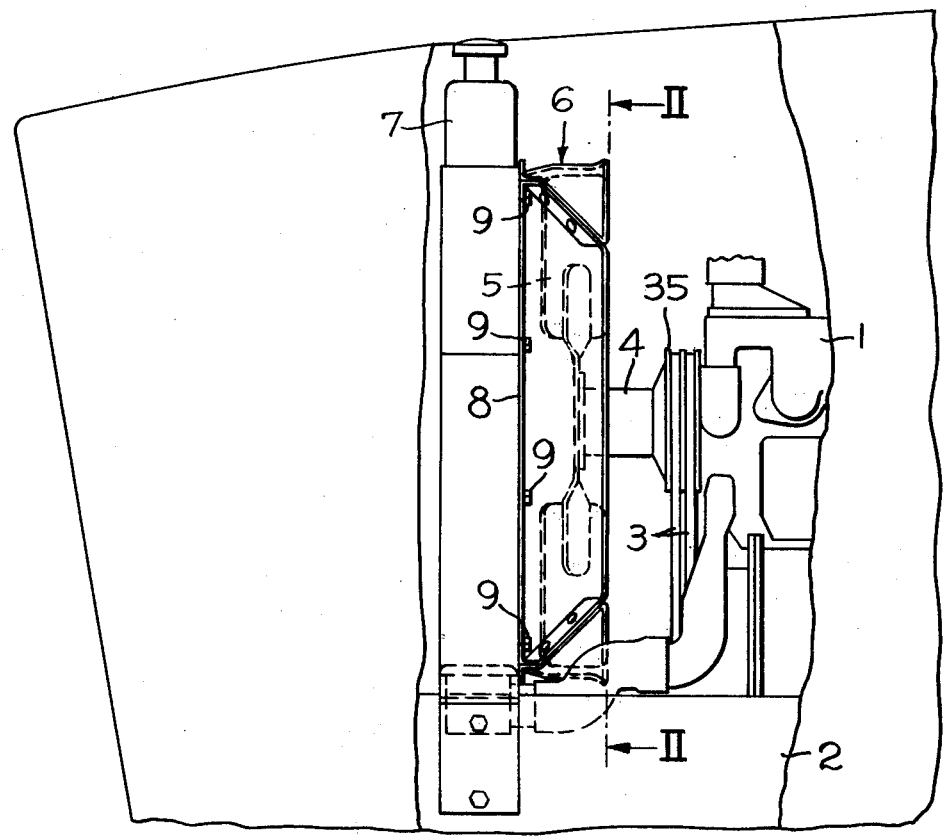
Fig.-1
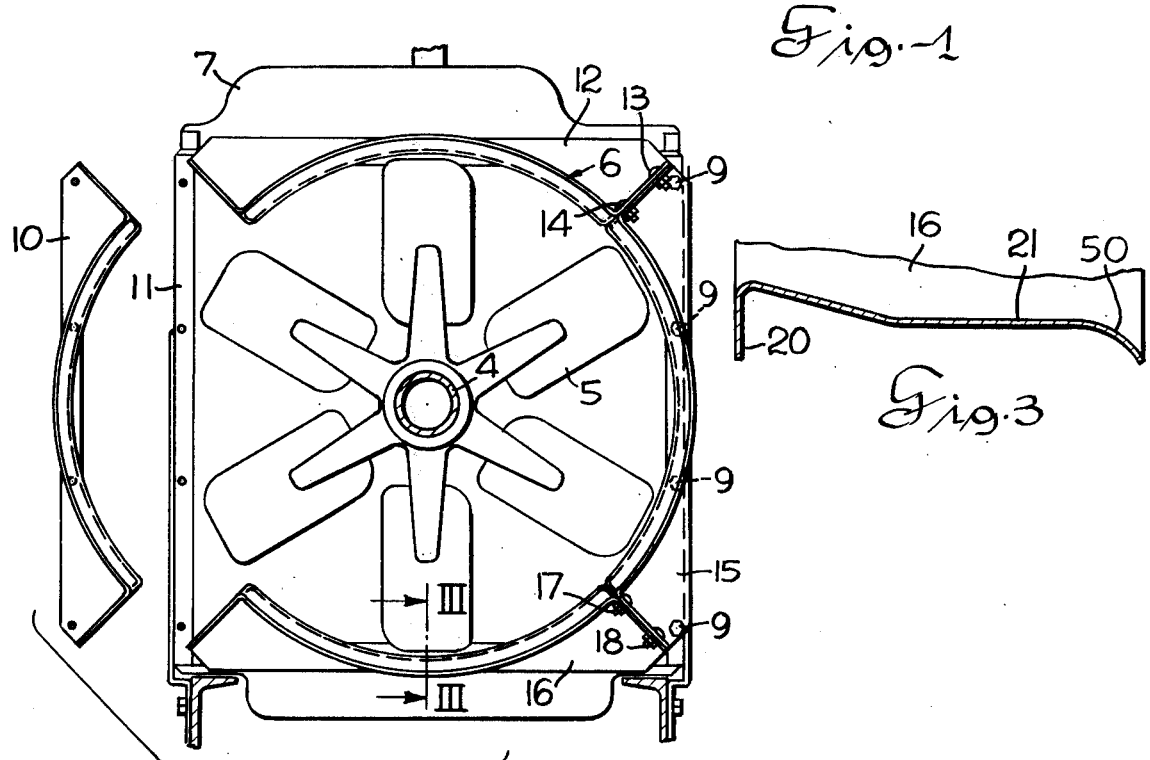
Fig.-2
Fig.-3

FOUR-PIECE FAN SHROUD

This invention relates to a cooling system for a motor vehicle and more particularly to a multi-piece fan shroud forming a bracket on the front end of the shroud adapted for mounting on a rectangular-shaped radiator and a venturi with a diffuser discharge portion on the rear end to provide efficient air flow through the shroud and recover kinetic energy of air flow, in the form of pressure, before dumping the air to ambience.

Conventional motor vehicles which are liquid cooled require radiators to operate as heat exchangers to dissipate the heat of the engine to the atmosphere. In order to operate more efficently, a fan is generally used to increase the flow of air across the radiating surfaces of the cooling passages in the radiator. To increase the efficency of the fan, a fan shroud may be used which is mounted behind the radiator to draw the air through the radiator as a fan discharges the air from the rear side of the shroud. A one-piece shroud presents a problem in servicing of the fan and the fan belt which is used for driving the fan.

Accordingly, this invention provides for a multi-piece fan shroud in which a single section can be removed to allow positioning of a fan belt on the fan pulley for driving the fan. In our example, a four-piece shroud is illustrated. Each of the pieces of the fan shroud is removable to allow inserting the belt around the fan and rotating to a position where the belt can be mounted on the fan pulley. When the shroud is made from sheet metal, the sections can be cut in such a manner that no trim is required after the section is formed. Blanks for forming the sections of the shroud are positioned in a die which is constructed so that the external surfaces of each of the sections of the shroud as assembled have diverging external surfaces. The surfaces flare outwardly and downwardly to avoid any binding surfaces when formed in the die. This permits freely removing lack of the sections from the die after the stamping by the die is completed. The diverging surfaces form the external periphery of the shroud when it is assembled. The internal surface of each of the sections of the fan shroud form uniform smooth-flowing lines to provide laminar flow through the venturi section of the shroud to provide efficient and quiet operation of the fan rotating within the shroud.

The sections of the shroud may be formed of plastic material through a molding process. The form of the sections would facilitate removal from the die.

Accordingly, it is an object of this invention to provide a multi-piece fan shroud having a bracket support on the front portion and an integral venturi discharge section forming the rearward portion of the shroud.

It is another object of this invention to provide a multi-piece fan shroud with a mounting bracket on the forward edge of the shroud and an integral air discharge rearward portion of the shroud with aligning and fastening means to connect the sections of the shroud.

It is a further object of this invention to provide a multi-piece fan shroud with a mounting bracket for mounting on a rectangular rear opening on the radiator and a circular diffuser rear discharge portion.

The objects of this invention are provided for in a multi-piece fan shroud constructed of sheet metal blanks formed by stamping in a die or molded in a die. The external surfaces of each section of the shroud as assembled form diverging surfaces to accommodate ease in withdrawal of the formed sections from the die or removal of the male die. Each of the sections is constructed with flanges adapted for fastening and aligning an adjacent section. The shroud is also formed with a mounting bracket on the forward periphery of the shroud which engages a rearward rectangular opening in the radiator and is securely fastened to the radiator. The rearward portion of the shroud forms a venturi section and diffuser for discharge of air caused by the movement of a fan for efficiency and quiet operation of the fan for cooling of the engine.

Referring to the drawings a preferred embodiment of this invention is illustrated.

FIG. 1 illustrates a side elevation view of the shroud mounted on the vehicle radiator with an engine driven fan.

FIG. 2 is a rear elevation view of the shroud on the radiator with one section of the shroud shown unbolted and exploded to the left.

FIG. 3 is a cross-section view taken on line III—III of FIG. 2.

Figure 4:
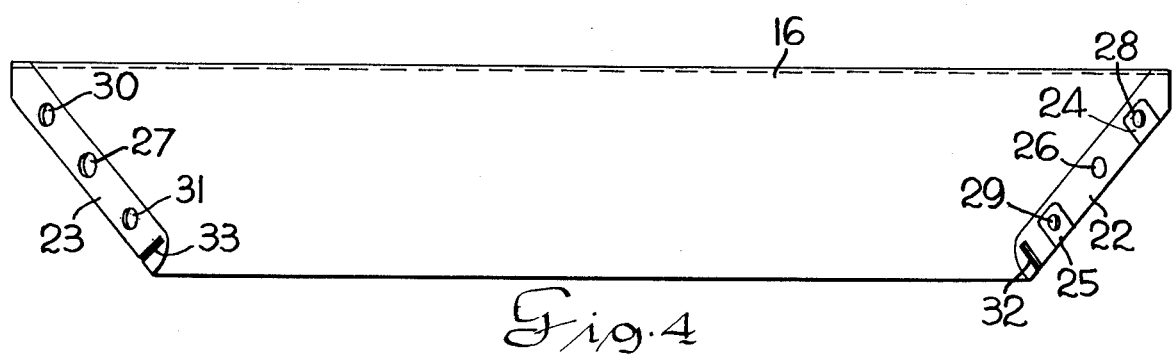
FIG. 4 is an internal view of one of the sections of the shroud.
Figure 5:
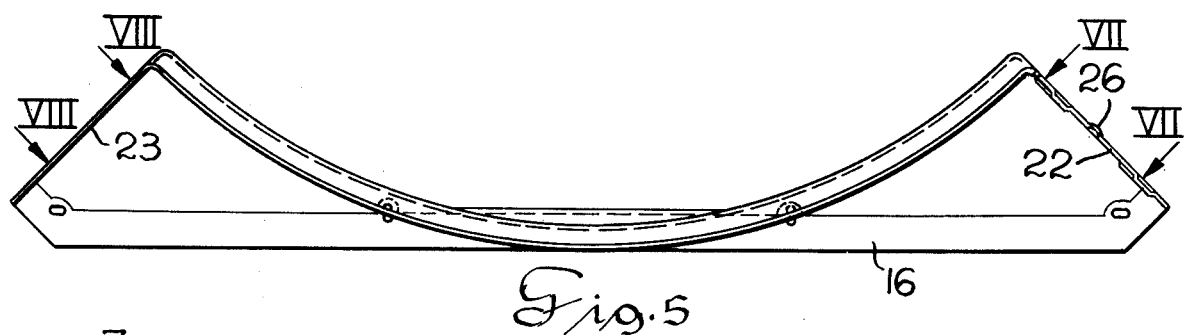
FIG. 5 is a rear view of one of the sections of the shroud.
Figure 6:
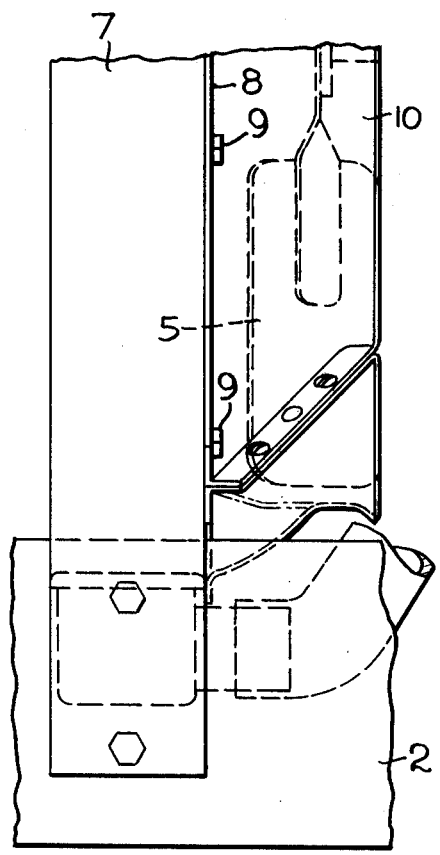
FIG. 6 is a modified view of the lower shroud section shown in FIG. 1, adapted to receive a larger radiator.
Figure 7:
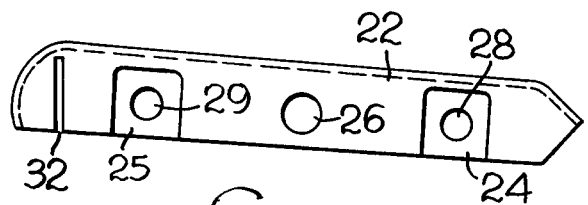
FIG. 7 is a view of one of the connecting flanges of the shroud taken on line VII—VII of FIG. 5.
Figure 8:
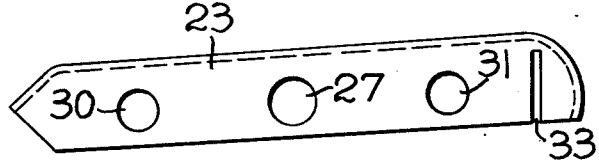
FIG. 8 is a view of the connecting flange of the opposite side of the shroud taken on line VIII—VIII of FIG. 5.

Referring to the drawings, an engine 1 is mounted on the vehicle chassis 2 which drives a fan belt 3. The shaft 4 drives the fan 5 mounted within the shroud 6. A radiator 7 is mounted on the vehicle chassis 2 and supports the shroud 6. The shroud 6 is fastened on the radiator through a radial flange 8 by means of a plurality of bolts 9. FIG. 2 shows the section 10 which is removed from the radiator showing the mounting surface 11 for supporting the radial flange 8 on the radiator 7.

The sections 12 and 15 are connected together by means of the bolts 13 and 14 as shown in FIG. 2. Similarly, the sections 15 and 16 are fastened together by the bolts 17 and 18. The section 15 is shown fastened to the radiator by means of the bolts 9.

The shroud may be constructed of four identical sections in which case the opening on the rearward side of the radiator would be a square opening. The rearward discharge opening on the shroud in any event would be circular to accomodate a fan which rotates internally of the shroud 21. The circular opening has a diameter approximately equal to the length of each side of the square. by converging rearwardly from the flange at the forward portion to the circular rearward diffuser portion, the shroud defines an intermediate restricting throat which provides a venturi. The convergence varies across the length of the section to accomodate the rotation of the fan. In the section shown in FIG. 3 the portion 21 interconnects the flange 20 and the diffuser portion 50. Referring to FIGS. 4, 5, 7 and 8, a section of the shroud is shown. FIG. 4 shows the internal view of the section of the shroud which is not assembled. The alignment flanges 22 and 23 are adapted for connecting the section 16 with the sections 10 and 15.

For the purpose of illustration, the section shown in FIGS. 4, 5, 7 and 8 will be considered section 16. Section 16 however, may be modified to accommodate a deeper section of radiator in which the section 16 would not be identical with all the other sections. Section 16 as illustrated here, however, will be assumed to be identical with the other sections of the shroud.

In viewing section 16 of the shroud in FIG. 4, all the surfaces on the inside when assembled are shown in this view. Likewise, all the outer surfaces are visible when viewed from the bottom side of the section and viewed toward the center of the shroud. The surfaces diverge outwardly to facilitate removal of the section from the die or withdrawal of die if molded.

The flange 22 is formed with recesses 24 and 25 which will accommodate positioning of clip muts to fasten the shroud section together with another section to facilitate assembly of the shroud. During process of stamping a raised protrusion 26 is formed on the flange 22 of section 16. The protrusion 26 is for alignment of the flange 22 with a flange similar to the flange 23. The flange 23 is formed with a opening 27 which receives the raised portion 26 when assembled. The bolts 17 and 18 would be received in the holes 28 and 29 and the holes 30 and 31 when the section 16 is assembled.

The slot 32 is cut in the blank to avoid having excess metal in this portion of the blank when the venturi section 21 is pressed and formed in the die simultaneously with forming of the flange 22. Similarly, the slot 33 is cut in the blank to avoid excess metal when the flange 23 and the venturi section 21 is formed in the pressing operation of the die. If shroud is molded, the slots are not needed.

The operation of this device will be described in the following paragraphs.

FIG. 1 shows the shroud in the assembled position with the fan in its operating position.

FIG. 2 shows the section 10 removed from the shroud 6 in order that the fan 5 with the fan belt 3 may be serviced.

By removal of the section 10, the fan belt may be positioned around the fan permitting it to rotate into a position of assembly on the pulley 35. The section 10 can be removed by disconnecting the bolts similar to the bolts 13 and 14, and 17 and 18 connecting the section 15 with sections 12 and 16. The section 10 is shown mounted on the radiator 7 by means of a plurality of bolts 9.

When the section 10 is mounted as an integral part of the shroud 6 the aligned raised surface 26 operates as a dowel as it is received in a aligned opening 27 of an adjoining section. The bolts and nuts are used for extending through the holes 28 and 30 and also through the holes 30 and 31 to fasten the shroud sections together. Suitable bolts and nuts are provided to assemble the shroud in this manner and likewise fasten the shroud to the radiator in its operating position.

The embodiments of the invention in which an exclusive property or privilege is claimed are defined as follows:

1. A multiple-piece fan shroud for use on a motor vehicle having a radiator and belt driven fan with tips passing closely adjacent the inner periphery of the shroud comprising, at least three individually formed sections of a shroud with each section defining diverging external surfaces forming the external surfaces of the shroud when assembled said diverging external surfaces adapting each of said sections for removal of the section without interference from a two-piece die each section including a mounting portion defining a mounting flange on the forward portion of the shroud having a linear edge adapted for mounting on a radiator, a venturi portion integral with the mounting portion defining a restricting throat segment converging radially inward at least along a major portion of said section and providing laminar air flow through the intermediate portion of the shroud, arcurate diffuser on the rearward portion of the shroud and intergral with said venturi portion for quiet discharge of air, aligning means and fastening means for connecting the sections of the shroud to form a rectangular front mounting portion and circular rear discharge portion adapted for providing a laminar air flow structure for operating in conjunction with a fan.

2. A multiple-piece fan shroud for use on a motor vehicle as set forth in claim 1 wherein at least two of said sections of said shroud defines identical sections.

3. A multiple-piece fan shroud for use on a motor vehicle as set forth in claim 1 wherein said sections comprise nonmetallic material.

4. A multiple-piece fan shroud for use on a motor vehicle as set forth in claim 1 wherein said aligning means includes ends formed on said sections, connecting flanges on the ends of each of said sections, a protrusion formed on one of said flanges, means defining an opening on the other mating flange adapted for aligning said connecting flanges of said sections.

5. A multiple-piece fan shroud for use on a motor vehicle as set forth in claim 1 including ends formed on said sections, flanges on the ends of said sections, means defining bolt holes in said flanges, said fastening means defining a plurality of bolts for reception in said connecting flanges for fastening said sections together.

6. A multiple-piece fan shroud for use on a motor vehicle as set forth in claim 1 including ends formed on said sections, fastening flanges on the ends of each of said sections, said aligning means defining an aligning protrusion and hole for aligning said flanges, said fastening means including said flange defining openings, and bolts for reception in said openings for fastenings of said sections of said shroud.

7. A multiple-piece fan shroud for use on a motor vehicle as set forth in claim 1 wherein said fastening means defines readily removable fastening means for connecting said sections of said shroud, and a second fastening means adapted for fastening said shroud to a radiator.

8. A multiple-piece fan shroud for use on a motor vehicle as set forth in claim 1 wherein each of said sections defines a sheet metal stamping.

9. A multiple-piece fan shroud for use on a motor vehicle as set forth in claim 1 wherein said mounting portion of said shroud defines a flange adapted for mounting on a radiator.

10. A multiple-piece fan shroud for use on a motor vehicle as set forth in claim 1 wherein each of said sections of said shroud define connecting flanges, each of said flanges define a surface lying in a diametrical plane extending through the center of the cylindrical opening of said shroud.

* * * * *